(12) United States Patent
Shibata et al.

(10) Patent No.: US 8,826,825 B2
(45) Date of Patent: Sep. 9, 2014

(54) ARTICLE TRANSPORT FACILITY

(75) Inventors: Suguru Shibata, Komaki (JP); Daisuke Ogawa, Komaki (JP); Yukio Iizuka, Gamo-gun (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 13/817,676

(22) PCT Filed: Jun. 17, 2011

(86) PCT No.: PCT/JP2011/063893
§ 371 (c)(1),
(2), (4) Date: Apr. 16, 2013

(87) PCT Pub. No.: WO2012/023338
PCT Pub. Date: Feb. 23, 2012

(65) Prior Publication Data
US 2013/0213755 A1    Aug. 22, 2013

(30) Foreign Application Priority Data

Aug. 19, 2010   (JP) .................................. 2010-184339

(51) Int. Cl.
*B61B 3/00*    (2006.01)
*B61J 1/06*    (2006.01)
*B61B 3/02*    (2006.01)

(52) U.S. Cl.
CPC ... *B61J 1/06* (2013.01); *B61B 3/02* (2013.01); B65G 2201/0297 (2013.01)
USPC ............... 104/89; 104/288; 104/91; 191/22 R

(58) Field of Classification Search
CPC ........... A63H 18/12; B60L 5/005; B60L 5/39; B60L 2200/26; B60L 23/002; B61B 13/00; B61B 13/04; B61B 13/08; B61B 13/127; B61B 1/00; H01L 21/67715; H01L 21/67727; H01L 21/6773; H01L 21/67733; H01L 21/67736; H01L 21/67259
USPC ............. 104/88.01–88.04, 89, 90, 91, 96, 97, 104/288, 287, 300, 130.01; 105/52–54, 61
See application file for complete search history.

(56) References Cited

U.S. PATENT DOCUMENTS 5,540,319 A * 7/1996 Orisaka et al. ............. 198/465.3
5,794,534 A * 8/1998 Enderlein et al. ............... 104/89

(Continued)

FOREIGN PATENT DOCUMENTS

JP        58154302 A    9/1983
JP        332602 U    3/1991

(Continued)

*Primary Examiner* — Jason C Smith
(74) *Attorney, Agent, or Firm* — The Webb Law Firm

(57) ABSTRACT

An article transport facility in which driving electric power can be supplied from an electricity supply line to an article transport vehicle so that it can travel through a crossing portion properly regardless of whether it is traveling along a first path or a second path. The switching device of the article transport facility is configured to switch a position change rail to a first position and a second position. The electricity supply line is supported by a first travel rail such that electric power can be supplied to the article transport vehicle traveling along the first travel rail and along the position change rail in the first position and is supported by the second travel rail such that electric power can be supplied to the article transport vehicle traveling along the second travel rail and along the position change rail in the second position.

5 Claims, 9 Drawing Sheets

(56) References Cited

U.S. PATENT DOCUMENTS

| | | | |
|---|---|---|---|
| 6,220,173 B1* | 4/2001 | Sauerwein | 104/130.01 |
| 6,591,961 B2* | 7/2003 | Fukushima | 198/346.2 |
| 6,629,502 B2* | 10/2003 | Matsukawa | 104/96 |
| 6,655,297 B2* | 12/2003 | Kawato et al. | 104/96 |
| 6,851,913 B2* | 2/2005 | Iizuka | 414/626 |
| 7,210,589 B2* | 5/2007 | Iizuka | 212/273 |
| 7,845,284 B2* | 12/2010 | Izumi et al. | 104/88.02 |
| 8,245,647 B2* | 8/2012 | Oguro et al. | 104/96 |
| 8,322,287 B2* | 12/2012 | Oguro et al. | 104/91 |
| 2002/0104726 A1* | 8/2002 | Kuzuya | 191/6 |
| 2003/0077159 A1* | 4/2003 | Iizuka | 414/609 |
| 2004/0025739 A1* | 2/2004 | Matsukawa | 104/96 |
| 2004/0253087 A1* | 12/2004 | Iizuka | 414/626 |
| 2005/0005808 A1* | 1/2005 | Wakabayashi et al. | 104/88.01 |
| 2005/0139114 A1* | 6/2005 | Nakao et al. | 104/96 |
| 2006/0016363 A1* | 1/2006 | Nakao et al. | 104/88.01 |
| 2006/0230975 A1* | 10/2006 | Shiwaku | 104/88.01 |
| 2009/0000505 A1* | 1/2009 | Shimamura et al. | 104/88.02 |
| 2010/0242783 A1* | 9/2010 | Oguro et al. | 104/91 |
| 2010/0242784 A1* | 9/2010 | Oguro et al. | 104/130.01 |
| 2011/0061559 A1* | 3/2011 | Lund | 104/119 |
| 2012/0305364 A1* | 12/2012 | Morimoto et al. | 198/370.01 |
| 2012/0312188 A1* | 12/2012 | Inui | 104/288 |
| 2013/0213755 A1* | 8/2013 | Shibata et al. | 191/22 R |

FOREIGN PATENT DOCUMENTS

| | | |
|---|---|---|
| JP | 2002238102 A | 8/2002 |
| JP | 2005001830 A | 1/2005 |

* cited by examiner

ARTICLE TRANSPORT FACILITY

BACKGROUND OF THE INVENTION

The present invention relates to an article transport facility comprising an article transport vehicle having a travel wheel and to which driving electric power is supplied from an electricity supply line installed along travel paths to allow the article transport vehicle to travel, a first path and a second path provided as the travel paths, switching means, provided in a crossing portion in which the first path and the second path cross each other, for switching between a first switched state in which the article transport vehicle is allowed to travel through the crossing portion along the first path and a second switched state in which the article transport vehicle is allowed to travel through the crossing portion along the second path.

BACKGROUND ART

In such article transport facilities, for example, electricity supply lines are supported by travel rails which define travel paths, and article transport vehicles have a power receiving portion to which driving electric power is supplied from the electricity supply lines without contact. The article transport vehicles are configured to receive driving electric power from the electricity supply lines with the power receiving portion without contact and to the travel along the travel paths by operating the driving device etc. using the received driving electric power. (See, for example, Japanese Publication of Application No. 2005-1830.)

A plurality of paths are provided as the travel paths in article transport facilities such as one described above. And, for example, there are facilities in which a first path and a second path are provided as travel paths and in which a crossing portion is provided in which the first path and the second path cross each other. In facilities having this crossing portion, in order to allow the article transport vehicle to travel through the crossing portion along the first path as well as along the second path, a switching means is provided which can be switched between a first switched state in which the article transport vehicle is allowed to pass the crossing portion along the first path and a second switched state in which the article transport vehicle is allowed to pass the crossing portion along the second path. (See, for example, Japanese Publication of Utility Model Application No. H03-32602.)

In the facility described in JP H03-32602, in each of the first path and the second path, a travel rail is provided, in each of an entrance portion which is in series with and extends toward the crossing portion and an exit portion which is in series with and extends from the crossing portion, for guiding and supporting the travel wheels provided to the article transport vehicle. In the crossing portion, a travel rotary rail is provided which can rotate about a vertical axis between a first position in which the rotary rail is in series with the travel rail provided in the entrance portion and in the exit portion in the first path and a second position in which the rotary rail is in series with the travel rail provided in the entrance portion and in the exit portion in the second path. The switching means switches the travel rotary rail to the first switched state by switching it to the first position and to the second switched state by switching it to the second position.

SUMMARY OF THE INVENTION

Problems to be Solved by the Invention

In a facility having the crossing portion described above as in the facility described in JP H03-32602 above, the travel rotary rail is switched between the first switched state in which the article transport vehicle is allowed to pass along the first path and the second switched state in which the article transport vehicle is allowed to pass along the second path by switching the position of the travel rotary rail between the first position and the second position. While this arrangement allows the article transport vehicles to travel along the first path as well as along the second path in the crossing portion, it is necessary to supply electric power to the power receiving portion provided to the article transport vehicle from the driving electricity supply lines in order for the article transport vehicle to travel along the first path or along the second path in the crossing portion.

To this end, it is conceivable to arrange the electricity supply lines to be supported by the travel rotary rail which guides and supports the travel wheels when traveling through the crossing portion, as in the facility described in JP 2005-1830 above. In this case, when switched to the first switched state to travel through the crossing portion along the first path, driving electric power can be supplied to the power receiving portion of the article transport vehicle from the electricity supply lines supported by the travel rotary rail in the first position. And when switched to the second switched state to travel through the crossing portion along the second path, driving electric power can also be supplied to the power receiving portion of the article transport vehicle from the electricity supply lines supported by the travel rotary rail in the second position.

However, in this case, since the position of the travel rotary rail is switched between the first position and the second position as the travel rotary rail is rotated about a vertical axis, the electricity supply lines have to be supported by the travel rotary rail such that they do not interfere with the rotation of the travel rotary rail between the first position and the second position. Therefore, the structure for supporting the electricity supply lines becomes complicated, which leads to a more complex structure.

The present invention was made in light of this issue and its object is to provide an article transport facility in which driving electric power can be properly supplied from the electricity supply line to the article transport vehicle, and in which the article transport vehicle can travel through the crossing portion properly regardless of whether the article transport vehicle is traveling along the first path or the second path, and in which the structure is simplified.

Means for Solving the Problems

In order to achieve this object, an article transport facility in accordance with the present invention comprises an article transport vehicle having a travel wheel and to which driving electric power is supplied from an electricity supply line installed along travel paths to allow the article transport vehicle to travel; a first path and a second path provided as the travel paths; switching means, provided in a crossing portion in which the first path and the second path cross each other, for switching between a first switched state in which the article transport vehicle is allowed to travel through the crossing portion along the first path and a second switched state in which the article transport vehicle is allowed to travel through the crossing portion along the second path;

a first travel rail that guides and supports the travel wheel is provided in the first path in each of an entrance portion that is in series with and extends toward the crossing portion and an exit portion that is in series with and extends away from the crossing portion, wherein a second travel rail that guides and supports the travel wheel is provided in the second path in each of an entrance portion that is in series with and extends toward the crossing portion and an exit portion that is in series with and extends away from the crossing portion, wherein a position change rail, whose position can be changed between a first position which is in series with the first travel rail and a second position which is in series with the second travel rail, is provided in the crossing portion, wherein the switching means is configured to be able to switch to the first switched state by switching the position change rail to the first position, and is configured to switch to the second switched state by switching the position change rail to the second position, wherein the electricity supply line is supported by the first travel rail such that driving electric power can be supplied to the article transport vehicle when traveling along the first travel rail and when traveling along the position change rail in the first position, and is supported by the second travel rail such that driving electric power can be supplied to the article transport vehicle when traveling along the second travel rail and when traveling along the position change rail in the second position.

With such a configuration, the first travel rail comes to be in series with the position change rail when the switching means switches the position change rail to the first position to switch to the first switched state. This allows the article transport vehicle to travel along the first travel rail and the position change rail in the first position and to travel through the crossing portion along the first path, with its travel wheel being guided and supported from the first travel rail and through the position change rail. At this time, because the electricity supply line is supported by the first travel rail such that driving electric power can be supplied to the article transport vehicle traveling along the first travel rail and along the position change rail in the first position, the article transport vehicle can receive supply of driving electric power from the electricity supply line and can properly travel along the first travel rail and along the position change rail in the first position using the driving electric power.

In addition, when the switching means switches the position change rail to the second position to switch to the second switched state, the second travel rail comes to be in series with the position change rail, similar to the case where the state is switched to the first switched state. Thus the article transport vehicle can travel along the second travel rail and along the position change rail in the second position, and thus can travel through the crossing portion along the second path. At this time, because the electricity supply line is supported by the second travel rail such that driving electric power can be supplied to the article transport vehicle traveling along the second travel rail and along the position change rail in the second position, the article transport vehicle can receive supply of driving electric power from the electricity supply line and can properly travel along the second travel rail and the position change rail in the second position using the driving electric power.

As described above, the electricity supply line supplies driving electric power to the article transport vehicle traveling along the first travel rail and along the position change rail in the first position and to the article transport vehicle traveling along the second travel rail and along the position change rail in the second position. However, the electricity supply line is supported not by the position change rail whose position can be changed, but by the first travel rail and the second travel rail. This allows the electricity supply line to be supported only by fixing the electricity supply line to, for example, the first travel rail and the second travel rail, which makes it possible to simplify the support structure for supporting the electricity supply line. Moreover, when installing the electricity supply line in a suitable position, the electricity supply line only needs to be fixed, for example, to the first travel rail and the second travel rail simply by adjusting the position of the electricity supply line to a suitable position for the power receiving portion of the article transport vehicle traveling along the first path or along the second path. Thus, the electricity supply line can be easily installed in a suitable position for, for example, the power receiving portion of the article transport vehicle. And because the electricity supply line is fixed to the first travel rail and the second travel rail, the electricity supply line is prevented from being displaced from the suitable position for, for example, the power receiving portion of the article transport vehicle so that driving electric power can be properly supplied to the article transport vehicle from the electricity supply line.

For the reasons stated above, an article transport facility is provided in which driving electric power can be properly supplied from the electricity supply line to the article transport vehicle while simplifying the structure, and in which the article transport vehicle can travel through the crossing portion properly regardless of whether the article transport vehicle is traveling along the first path or the second path.

In an embodiment of the article transport facility in accordance with the present invention, the electricity supply line is preferably supported by the first travel rail such that the electricity supply line extends from a first travel rail side and beyond an end of the position change rail in the first position and into the position change rail in plan view so that the electricity supply line can supply driving electric power to the article transport vehicle traveling along the position change rail in the first position, and is preferably supported by the second travel rail such that the electricity supply line extends from a second travel rail side and beyond an end of the position change rail in the second position and into the position change rail in plan view so that the electricity supply line can supply driving electric power to the article transport vehicle traveling along the position change rail in the second position.

With such a configuration, because the electricity supply line is supported by the first travel rail such that it extends from the first travel rail side and into the position change rail in the first position in plan view, the electricity supply line can be supported by the first travel rail while the portion of the electricity supply line that extends into the position change rail in the first position can be located in a suitable position for supplying electricity to the power receiving portion etc. of the article transport vehicle traveling along the position change rail in the first position. Thus, driving electric power can be supplied to the article transport vehicle traveling along the position change rail in the first position. In addition, because the electricity supply line is supported by the second travel rail such that it extends from the second travel rail side and into the position change rail in the second position in plan view, the electricity supply line can be supported by the second travel rail while the portion of the electricity supply line that extends into the position change rail in the second position can be located in a suitable position for supplying electricity to the power receiving portion etc. of the article transport vehicle traveling along the position change rail in the second position. Thus, driving electric power can be supplied to the article transport vehicle traveling along the position change rail in the second position. Thus, with the electricity supply line supported by the first travel rail and the second travel rail, driving electric power can be properly supplied to the article transport vehicle traveling along the position change rail in either position, i.e., the first position or the second position.

In an embodiment of the article transport facility in accordance with the present invention, the article transport vehicle preferably includes, as the travel wheel, a pair of right and left travel wheels which are spaced apart from each other in the lateral direction of the article transport vehicle, wherein the first travel rail, the second travel rail, and the position change rail are each preferably provided as a pair of right and left rails so as to guide and support the pair of respective ones of the right and left travel wheels.

With such a configuration, the article transport vehicle is allowed to travel with each of a pair of right and left travel wheel being guided and supported by each of the first travel rails, the second travel rails, and the position change rails. Therefore, the article transport vehicle can achieve a stable travel when traveling through the crossing portion along the first path and also when traveling through the crossing portion along the second path because both wheels of the pair of right and left travel wheels are guided and supported properly.

In an embodiment of the article transport facility in accordance with the present invention, the electricity supply line is preferably provided as a pair of right and left electricity supply lines which are spaced apart from each other in a lateral direction of the article transport vehicle such that the electricity supply lines are supported by the pair of right and left first travel rails and by the pair of right and left second travel rails.

With such a configuration, because a pair of right and left electricity supply lines is provided as the electricity supply line so that driving electric power can be supplied to the article transport vehicle by the pair of right and left electricity supply lines, it is easier to reliably supply driving electric power of the required amount to the article transport vehicle compared with a case, for example, where driving electric power is supplied by one electricity supply line. And by making use of the pair of right and left first travel rails and the pair of right and left second travel rails which guide and support the pair of right and left travel wheels, the pair of right and left electricity supply lines can be installed simply and properly such that they are spaced apart from each other in the lateral direction of the article transport vehicle.

In an embodiment of the article transport facility in accordance with the present invention, the pair of right and left first travel rails, and the pair of right and left second travel rails are preferably arranged such that the first travel rail and the second travel rail that are next to each other cross each other perpendicularly, wherein the electricity supply lines preferably include four bent portions, each of which preferably extends from a first travel rail side to the position change rail side in the first position and which is then bent and extends from a position change rail side in the second position and to a second travel rail side, and wherein preferably provided to each of the first travel rail and the second travel rail that cross each other perpendicularly is an electricity supply line support body which extends between the first travel rail and the second travel rail and which is generally bent at the right angle for supporting the bent portion of the electricity supply lines.

With such a configuration, each of the four bent portions is installed such that it extends from the first travel rail side to the position change rail side in the first position and which is then bent and extends from the position change rail side in the second position and to the second travel rail side. Thus, driving electric power can be supplied to the article transport vehicle traveling along the first travel rail and the position change rail in the first position by the portion of the bent portion that extends from the first travel rail side to the position change rail side in the first position. And driving electric power can be supplied to the article transport vehicle traveling along the second travel rail and the position change rail in the second position by the portion of the bent portion that extends from the second travel rail side to the position change rail side in the second position. Thus, one bent portion can function both as a part of the electricity supply line for supplying driving electric power to the article transport vehicle traveling through the crossing portion along the first path and as a part of the electricity supply line for supplying driving electric power to the article transport vehicle traveling through the crossing portion along the second path. And an electricity supply line support body which is generally bent at the right angle is provided to each of the first travel rail and the second travel rail that intersect each other perpendicularly so that each bent portion can be supported by the electricity supply line support body. This allows each one of the bent portions to be supported by just one electricity supply line support body, which makes it possible to simplify the support structure for supporting the electricity supply lines. In addition, the four bent portions can be installed in a well-balanced manner with one bent portion installed to each of the first travel rail and the second travel rail that cross perpendicularly. With each bent portion installed in a well-balanced manner, it is possible to properly supply driving electric power in a well-balanced manner to both the article transport vehicle traveling through the crossing portion along the first path and the article transport vehicle traveling through the crossing portion along the second path.

In an embodiment of the article transport facility in accordance with the present invention, a pair of front and back travel wheels are preferably provided, as the travel wheel, to the article transport vehicle such that the front and back travel wheels are spaced apart from each other in a fore and aft direction of the article transport vehicle, wherein the position change rail is preferably configured such that a length of the position change rail in the travel direction of the article transport vehicle is shorter than a wheelbase of the pair of front and back travel wheels.

With such a configuration, the position change rail is configured such that the length of the position change rail in the travel direction of the article transport vehicle is shorter than the wheelbase of the pair of front and back travel wheels. Thus, when the article transport vehicle travels through the crossing portion, the position change rail guides and supports only one of the pair of front and back travel wheels while either the first travel rail or the second travel rail can guide and support the other of the pair of front and back travel wheels, as opposed to the position change rail guiding and supporting both of the pair of front and back travel wheels simultaneously. Therefore, the position change rail does not need to be as strong as the first travel rail or the second travel rail, which makes it possible to reduce weight of and complexity of the structure. Thus, a simple structure can also be used for the support structure for changing the position of the position change rail between the first position and the second position.

DETAILED DESCRIPTION OF THE INVENTION

The embodiments of the article transport facility in accordance with the present invention are described next with reference to the drawings.

Figure 1:
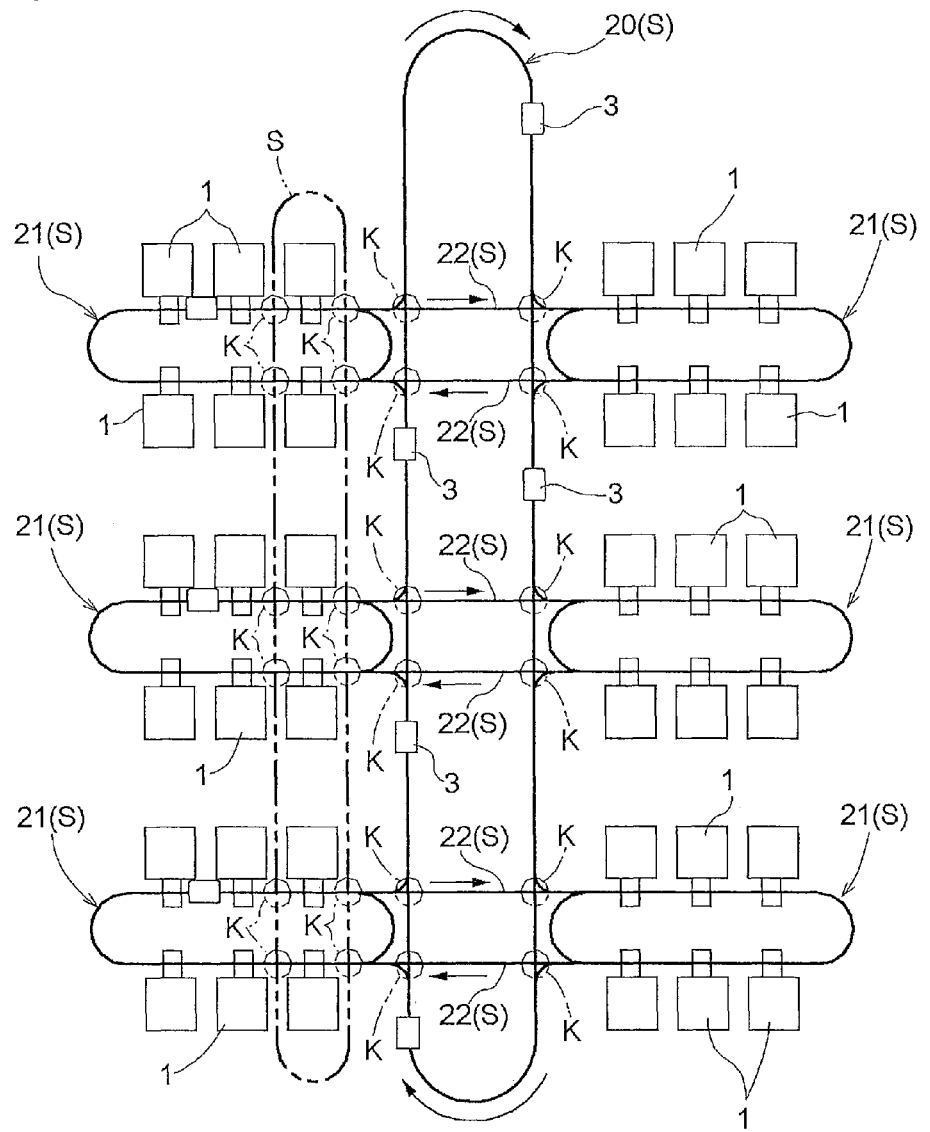
FIG. 1 is an overall plan view of an article transport facility.
Figure 2:
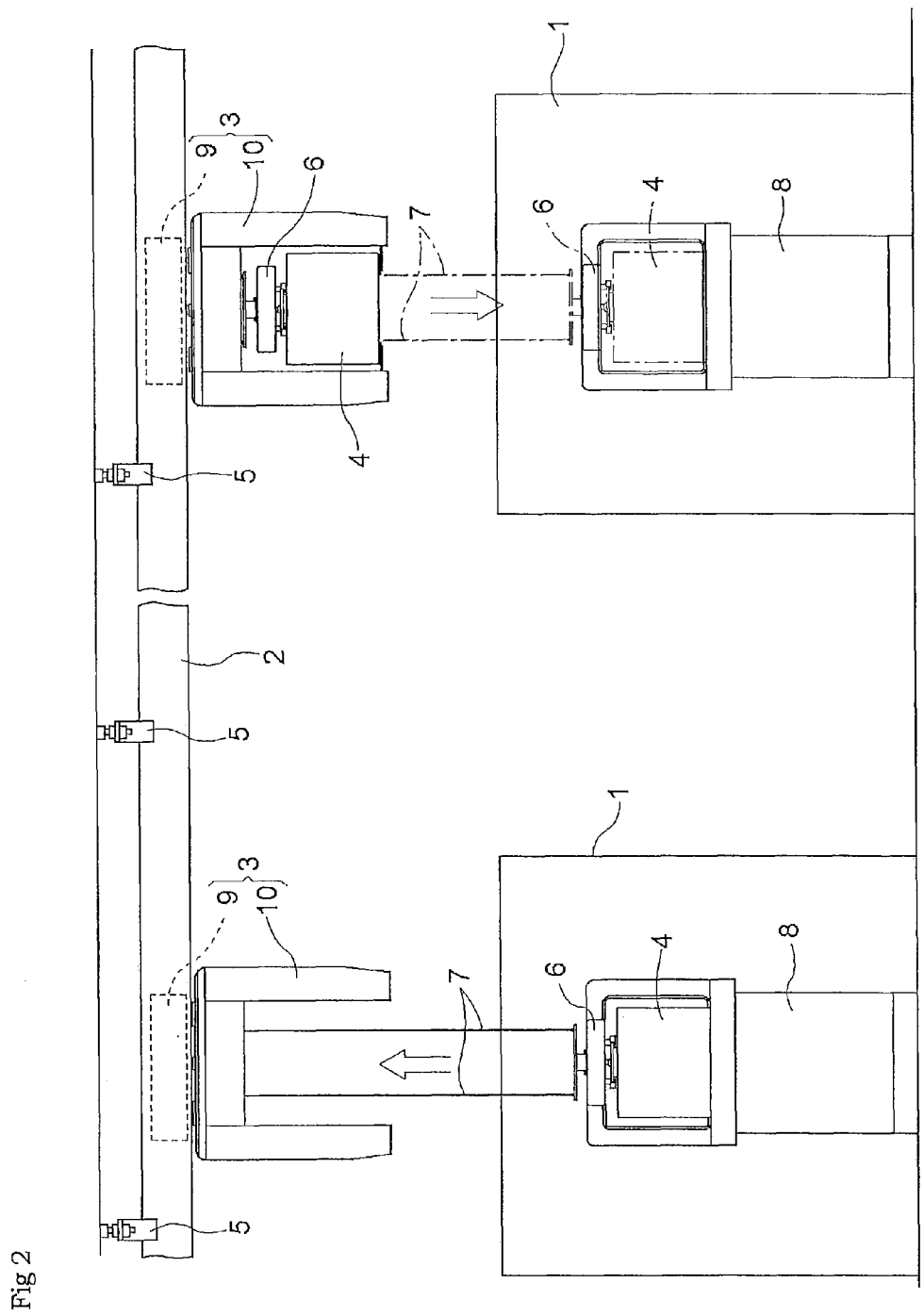
FIG. 2 is a side view of a part of the article transport facility.

As shown in FIG. 1, in the article transport facility, travel rails 2 are installed on the ceiling side so as to extend along, or by way of, a plurality of article processors 1 to define travel paths S. And a plurality of article transport vehicles 3 of the ceiling transport type which can move in one direction along the travel paths S are provided. As shown in FIG. 2, in this article transport facility, articles 4 are containers for storing items to be transported, such as semiconductor substrates or reticles. And the article transport vehicles 3 are configured to transport the articles 4 among the plurality of article processors 1. The travel rails 2 are fixedly installed in the ceiling portion by means of travel rail brackets 5.

As shown in FIG. 2, the article transport vehicle 3 includes a grip portion 6 for suspending and griping an article 4 such that the grip portion 6 can be vertically moved, or raised and lowered. The grip portion 6 is configured to be moved vertically between a raised position which is close to the article transport vehicle 3 and a lowered position for performing article transfer to and from an article transfer station 8 installed below the article transport vehicle 3 by spooling and feeding out wires 7 with the article transport vehicle 3 stopped. Belts, for example, may be used in place of the wires 7.

Incidentally, FIG. 2 shows a case where the grip portion 6 is lowered to the lowered position from the raised position as well as a case where the grip portion 6 is raised to the raised position from the lowered position.

The station 8 includes a supporting platform which receives and supports an article 4. And the station 8 is provided for receiving from the article transport vehicle 3 an article 4 on which a predetermined processing is to be performed by the article processor 1 and also for delivering the article 4, on which the predetermined processing has been performed by the article processor 1, to the article transport vehicle 3. And a station 8 is provided in association with each of the plurality of article processors 1.

The article transport vehicle 3 is configured to travel along the travel rails 2 with the grip portion 6 located in the raised position and to deliver and receive (i.e., transfer) the article 4 to and from a station 8 by vertically moving the grip portion 6 between the raised position and the lowered position while stopped at a stop position associated with the station 8 that is the transfer target among the plurality of stations 8.

The article transport vehicle 3 is configured to include a travel drive portion 9 for traveling on the travel rails 2 and an article support 10 which is suspended and supported by the travel drive portion 9 such that the article support 10 is located under the travel rails 2.

Figure 3:
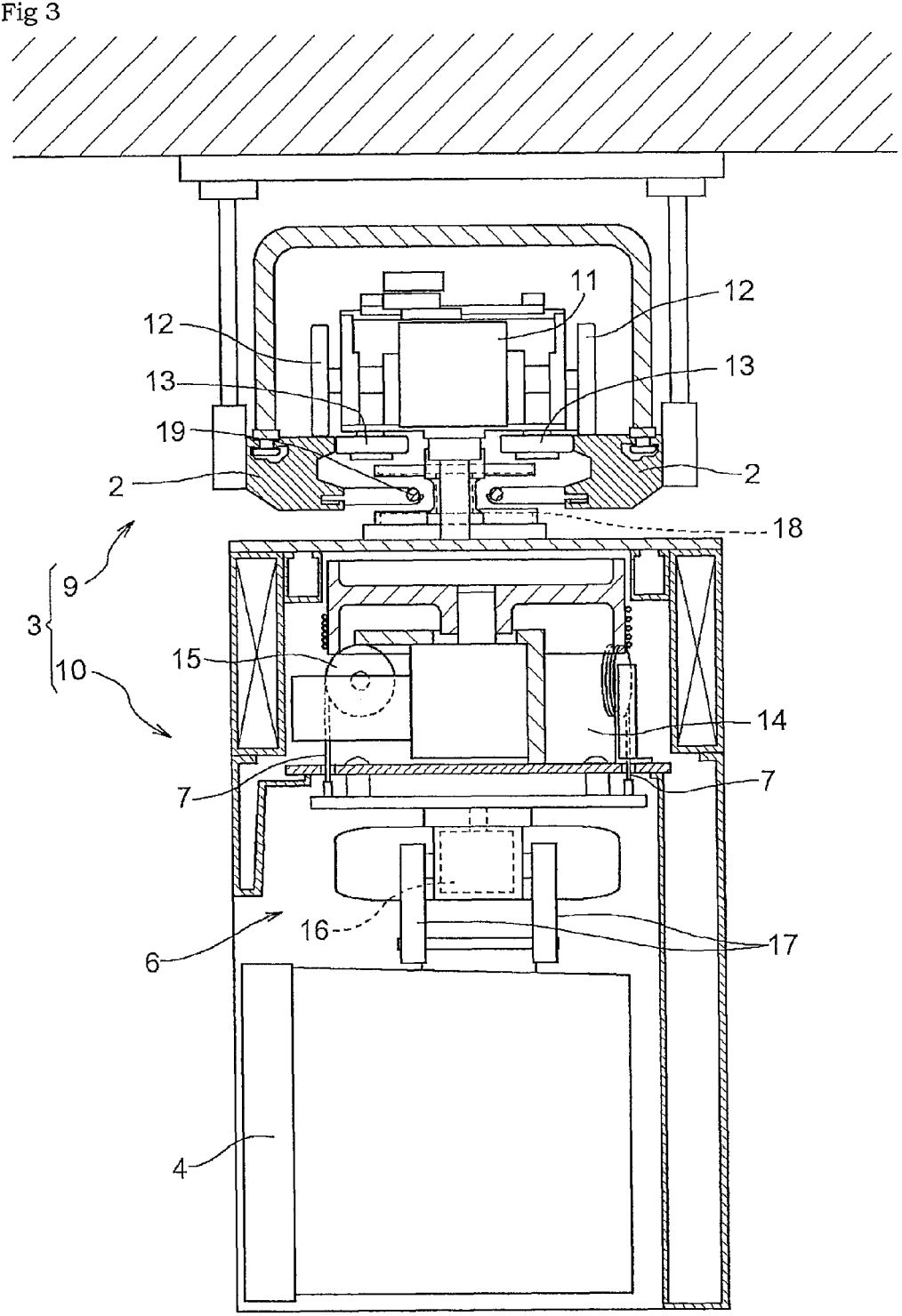
FIG. 3 is a sectional view of the article transport vehicle as seen in a direction along its travel direction.

As shown in FIG. 3, provided as the travel rails 2 are a pair of right and left travel rails 2 which are spaced apart from each other in a lateral direction of the article transport vehicle 3. And the travel drive portion 9 includes travel wheels 12 which are driven and rotated by drive motors 11 and which roll on respective top surfaces, that extend along a horizontal plane, of the pair of right and left travel rails 2, and travel guide wheels 13 which can be rotated freely and which are in contact with side faces, of the pair of right and left travel rails 2, that extend vertically and that face each other. And the article transport vehicle 3 is configured to travel while being guided by the travel rails 2 by virtue of the fact that the travel wheels 12 are driven and rotated by the drive motors 11 about axes that extend along the lateral direction of the article transport vehicle 3 and of the fact that the travel guide wheels 13 which can be rotated freely about vertical axes are contacted and guided by the pair of right and left travel rails 2.

Figure 5:
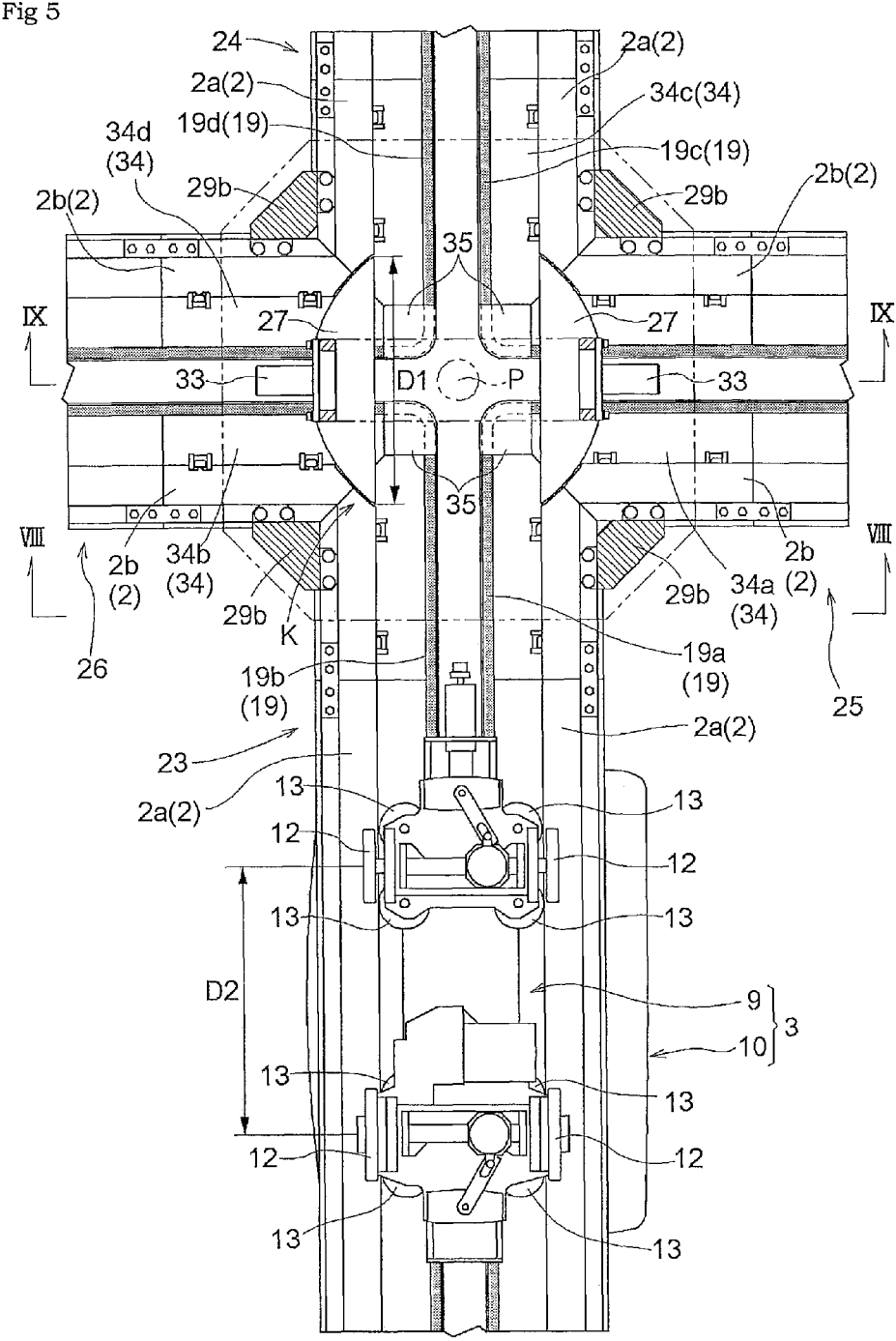
FIG. 5 is a plan schematic view showing the entire crossing portion.

As shown in FIG. 5, the travel wheels 12 include two pairs of right and left travel wheels 12 with a total of four travel wheels 12, with each pair including right and left travel wheels located at opposite ends in the lateral direction of the article transport vehicle 3, and with one pair of travel wheels 12 spaced apart from the other pair in a fore and aft direction of the article transport vehicle 3. The travel guide wheels 13 include two groups of travel guide wheels 13 with one group spaced apart from the other in the fore and aft direction of the article transport vehicle 3 with each group having two travel guide wheels at each opposite end in the lateral direction of the article transport vehicle 3 with a total of eight travel guide wheels 13.

Referring back to FIG. 3, the article support 10 includes rotating drums 15 which spool the wires 7 and which are driven and rotated by vertical movement motors 14, and the grip portion 6 which is suspended and supported by the wires 7. The grip portion 6 includes a gripper 17 which can be switched by a gripper motor 16 between a gripping attitude for gripping an article 4 and a grip release attitude in which the grip is released. And the grip portion 6 and the article 4 gripped by the grip portion 6 are moved vertically by drivingly rotating the rotating drums 15 with the vertical movement motors 14 whereas the gripper 17 is configured to be switched by the gripper motor 16 to grip or release the grip on the article 4.

The article transport vehicle 3 includes a power receiving coil 18 in a central section in the fore and aft direction and the lateral direction of the article transport vehicle 3 and is configured to receive driving electric power from electricity supply lines 19 with this power receiving coil 18. The power receiving coil 18 has a cross-sectional shape, as seen in a direction along a fore and aft direction of the article transport vehicle 3, that includes a horizontally extending upper portion, a horizontally extending lower portion which is located below the upper portion, and a vertically extending portion which connects together central portions of the upper and lower portions. One pair of right and left electricity supply lines 19 are installed such that they are supported by the travel rails 2. And the pair of right and left electricity supply lines 19 are installed between the pair of right and left travel rails 2 such that they are spaced apart from each other in the lateral direction of the article transport vehicle 3. And magnetic field is generated by applying alternating currents to the electricity supply lines 19. The magnetic field causes driving electric power to be generated in the receiving coil 18 so that driving electric power is supplied to the article transport vehicle 3 without contact. With driving electric power supplied to the power receiving coil 18 from the electricity supply lines 19, the article transport vehicle 3 uses the driving electric power to cause the travel drive portion 9 to travel and cause the grip portion 6 to be moved vertically, among other things. And to properly supply electricity from the electricity supply lines 19 to the power receiving coil 18, the electricity supply lines 19 are supported by the travel rails 2 with the installation positions of the electricity supply lines 19 adjusted such that they are located within an electricity suppliable region of the power receiving coil 18 (i.e., region or area vertically between the upper portion and the lower portion of the power receiving coil 18).

In this article transport facility, the travel paths S along which the article transport vehicle 3 travels is formed or defined by the travel rails 2. And as shown in FIG. 1, provided as the travel paths S are a loop-shaped primary path 20 and loop-shaped secondary paths 21, and connecting paths which connect the primary path 20 and the secondary paths 21 and which allow the article transport vehicle 3 to diverge from the primary path 20 to a secondary path 21 and to converge from a secondary path 21 to the primary path 20.

The primary path 20 is configured as a loop-shaped path having a pair of straight portions that are located opposite each other and a pair of curved portions for connecting together respective terminating end portions and beginning end portions of the straight portions. A plurality of secondary paths 21 (for example, three secondary paths 21 as shown in FIG. 1) are located on the outside of the primary path 20, are spaced apart from each other in the travel direction of the article transport vehicle 3 in the primary path 20, and are located on one and the other side of the primary path 20. The secondary paths 21 are arranged such that the secondary paths 21 on one side of the primary path 20 and the secondary paths 21 on the other side of the primary path 20 are located at positions along the primary path 20 that are opposite each other with the primary path 20 located therebetween.

Each secondary path 21 includes a straight portion that extends away from the primary path 20 and a straight portion that extends toward the primary path 20 such that they are located opposite each other and such that they extend along, or by way of, a plurality of stations 8. And each secondary path 21 has a shape of a loop with a pair of straight portions and a pair of curved portions which connect terminating end portions and beginning end portions of the pair of straight portions. Target stop positions for transferring articles 4 between respective stations 8 and the article transport vehicle 3 are defined at intermediate locations of the secondary path 21. The article transport vehicle 3 vertically moves the grip portion 6 to transfer an article 4 to and from a station 8 while stopped at a target stop position.

The connecting paths which connect the primary path 20 with a secondary path 21 are provided to each of the plurality of secondary paths 21. And the connecting paths consist of diverging paths each of which branches or breaks off from a straight portion of the primary path 20 and extends away from the primary path 20 and each of which is connected to a straight portion of the secondary path 21 as well as a converging path which joins or merges the primary path 20 from a terminating end portion of a straight portion of a secondary path 21 that extends toward the primary path 20. And in the primary path 20, the branching location of a diverging path is on an upstream side in the travel direction of the article transport vehicle 3 with respect to the merging or converging location of the associated converging path. When the article transport vehicle 3 diverges to a secondary path 21 from the primary path 20, it continues to travel along the secondary path 21 from the travel direction in which it traveled in the primary path 20. Also, when the article transport vehicle 3 merges into the primary path 20 from a secondary path 21, it continues to travel along the secondary path 21 from the travel direction in which it traveled in the secondary path 21.

In this article transport facility, provided in addition to the connecting paths are inter-secondary-path connecting paths 22, each of which connects a secondary path 21 located on one side of the primary path 20 with a secondary path 21 located on the other side so that the article transport vehicle 3 can travel between the secondary path 21 located on one side of the primary path 20 and the secondary path 21 on the other side without having to travel along the primary path 20.

The inter-secondary-path connecting path 22 has its one end connected to the secondary path 21 located on one side of the primary path 20 and its the other end connected to the secondary path 21 located on the other side of the primary path 20, and its intermediate portion which crosses the primary path 20. An inter-secondary-path connecting path 22 consists of straight paths which connect secondary paths 21 located at positions in the primary path 20 that are opposite each other with the primary path 20 located therebetween.

Two inter-secondary-path connecting paths 22 are provided to connect one secondary path 21 with another. This allows one of the two inter-secondary-path connecting paths 22 to be used as a path in which the article transport vehicle 3 is allowed to travel from the secondary path 21 on one side of the primary path 20 (for example, one on the left hand side in FIG.

1) to the secondary path 21 on the other side (for example, one on the right hand side in FIG. 1) and allows the other of the two inter-secondary-path connecting paths 22 to be used as a path in which the article transport vehicle 3 is allowed to travel from the secondary path 21 on the other side of the primary path 20 (for example, one on the right hand side in FIG. 1) to the secondary path 21 of the one side (for example, one on the left hand side in FIG. 1). Each of the two inter-secondary-path connecting paths 22 connecting one secondary path 21 with another has its beginning end side connected to the terminating end portion of the straight portion of the secondary path 21 on one side that extends toward the primary path 20, and its terminating end side connected to the beginning end portion of the straight portion of the secondary path 21 on the other side that extends away from the primary path 20. As shown by the arrows in FIG. 1, this allows the travel direction when traveling along the secondary path 21 on one side, the travel direction when traveling along the inter-secondary-path connecting path 22, and the travel direction when traveling along the secondary path 21 on the other side to be the same when the article transport vehicle 3 travels from the secondary path 21 on one side to the secondary path 21 on the other side along the inter-secondary-path connecting path 22, which allows for smooth travel from the secondary path 21 on one side to the secondary path 21 on the other side along the inter-secondary-path connecting path 22.

The inter-secondary-path connecting path 22 is configured to perpendicularly cross each of a pair of straight portions of the primary path 20. And the location where the straight portion of the primary path 20 and an inter-secondary-path connecting path 22 are connected to each other is a crossing portion K.

Regarding travel of a plurality of article transport vehicles 3, a facility management computer which manages operations of the plurality of movable bodies 3 over the entire travel paths S is provided, and each article transport vehicle 3 is provided with a carriage side controller which controls operation of the article transport vehicle 3 based on operation command information from the facility management computer. The controllers and operation management portion (described below), such as a computer in the present specification belong to conventional technology and have a CPU, memory, a communication unit, etc., in which algorithms for performing the functions described in the present specification are stored in memory.

While not shown, the article transport vehicle 3 has various sensors including, for example, a stop plate detection sensor for detecting stop plates which are installed, for example, in a side of a travel rail 2 to indicate the target stop position associated with each station 8, an absolute position plate detection sensor for detecting absolute position plates which indicate positions (or distance) from a reference point in the travel path S, which is installed, for example, in a side of a travel rail 2, and a travel distance sensor for detecting the distance traveled by the article transport vehicle 3. The carriage side controller keeps track of the current position of the article transport vehicle 3 in the travel paths S based on the detected information from the absolute position plate detection sensor and the detected information from the travel distance sensor after an absolute position plate detection sensor is detected, and transmits the current position information and carriage identifying information, such as, a carriage number which allows identification of the article transport vehicle among the plurality of article transport vehicles 3 to the facility management computer by, for example, wireless communication.

The facility management computer manages, or keeps track of, respective current positions of the plurality of article transport vehicles 3 based on the current position information and carriage identifying information from each carriage side controller to manage the operations of the plurality of article transport vehicles 3. The facility management computer is configured to select one transport vehicle 3 for transporting from the plurality of article transport vehicles 3, and to issue, as operation command information and to the selected article transport vehicle 3, a transport command, which specifies the station 8 of transport origin and the station 8 of transport destination among the plurality of stations 8, for transporting an article 4 from the station 8 of transport origin to the station 8 of transport destination. In addition, when causing the article transport vehicle 3 to travel from the transport origin to the transport destination, the facility management computer is configured to select from the plurality of paths the shortest route with the shortest travel distance, for example, and to issue operation command information for causing the article transport vehicle 3 to travel along the selected shortest route.

Thus, the carriage side controller of the article transport vehicle 3 that receives the transport command controls the travel of the article transport vehicle 3 to travel to the specified station 8 of transport origin and controls the vertical movement operation of the grip portion 6 and the switch operation of the grip portion 6, based on the detected information from various sensors to receive an article 4 from the station 8 of transport origin. Subsequently, the carriage side controller controls the travel of the article transport vehicle 3 to cause it to travel to the specified station 8 of transport origin based on the detected information from various sensors, and delivers the article 4 to the station 8 of transport destination.

As shown in FIG. 1, two or more locations such as crossing portions K (for example, portions that are enclosed by dashed lines) in each of which a straight portion of the primary path 20 and an inter-secondary-path connecting path 22 cross each other perpendicularly and converging portions in each of which a certain path and another path join or merge each other. And a collision between article transport vehicles 3 may occur at locations such as crossing portions K and the converging portions. To this end, as described above, the facility management computer basically manages the operations of the article transport vehicles 3 along the travel paths S. However, at such locations as the crossing portions K and the converging portions, an operation management portion is provided in addition to the facility management computer to manage operations of the article transport vehicles 3 so that the article transport vehicles 3 are allowed to travel while preventing collisions between article transport vehicles 3.

For example, when entering into a crossing portion K or a converging portion, the carriage side controller of the article transport vehicle 3 controls the traveling of the article transport vehicle 3 by inquiring the operation management portion and at a location before entering, as to whether the entry is permitted, and traveling into the crossing portion K or the converging portion only when the entry is permitted. On the other hand, when there is an inquiry from a carriage side controller as to whether an entry is permitted, the operation management portion issues operation command information to the carriage side controller to allow only one article transport vehicle 3 to enter the portion K or the converging portion.

[Crossing Portion]

As described above, each crossing portion K is a location where a straight portion of the primary path 20 and an inter-secondary-path connecting path 22 are connected to each other. And this crossing portion K is configured such that the primary path 20 (which functions as the first path) and the inter-secondary-path connecting path 22 (which functions as the second path) cross each other perpendicularly. And the article transport facility in accordance with the present invention is configured to allow the article transport vehicle 3 to properly travel in the crossing portion K both along the primary path 20 and along the inter-secondary-path connecting path 22 by supplying driving electric power properly from the electricity supply lines 19 to the article transport vehicle 3 while simplifying the structure in a facility having such a crossing portion K.

The article transport facility in accordance with the present invention is further described next with reference to FIGS. 4-9 in which the primary path 20 is referred to as the first travel path and the inter-secondary-path connecting paths 22 are referred to as the second travel paths.

Figure 4:
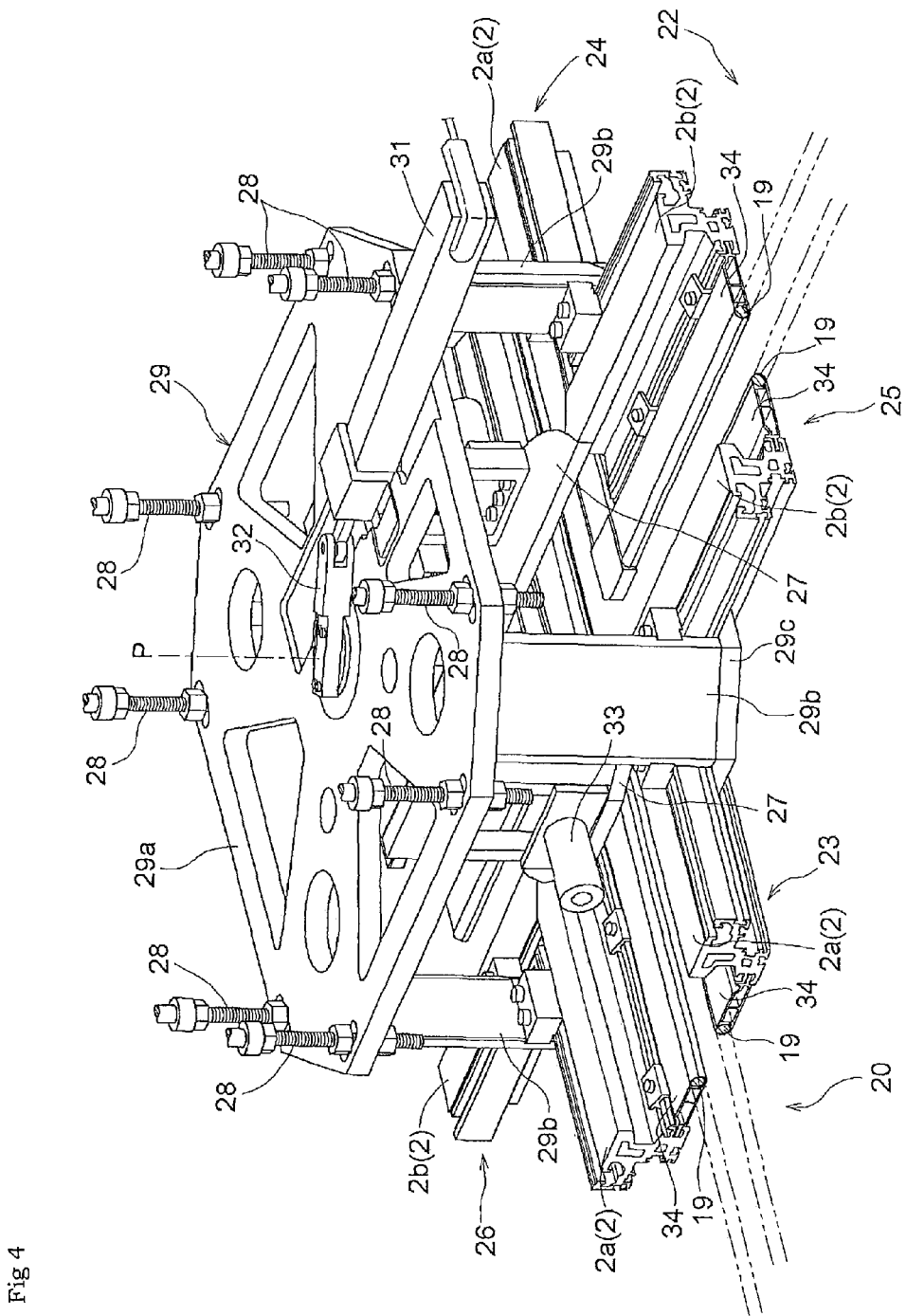
FIG. 4 is a perspective schematic view showing the entire crossing portion.
Figure 6:
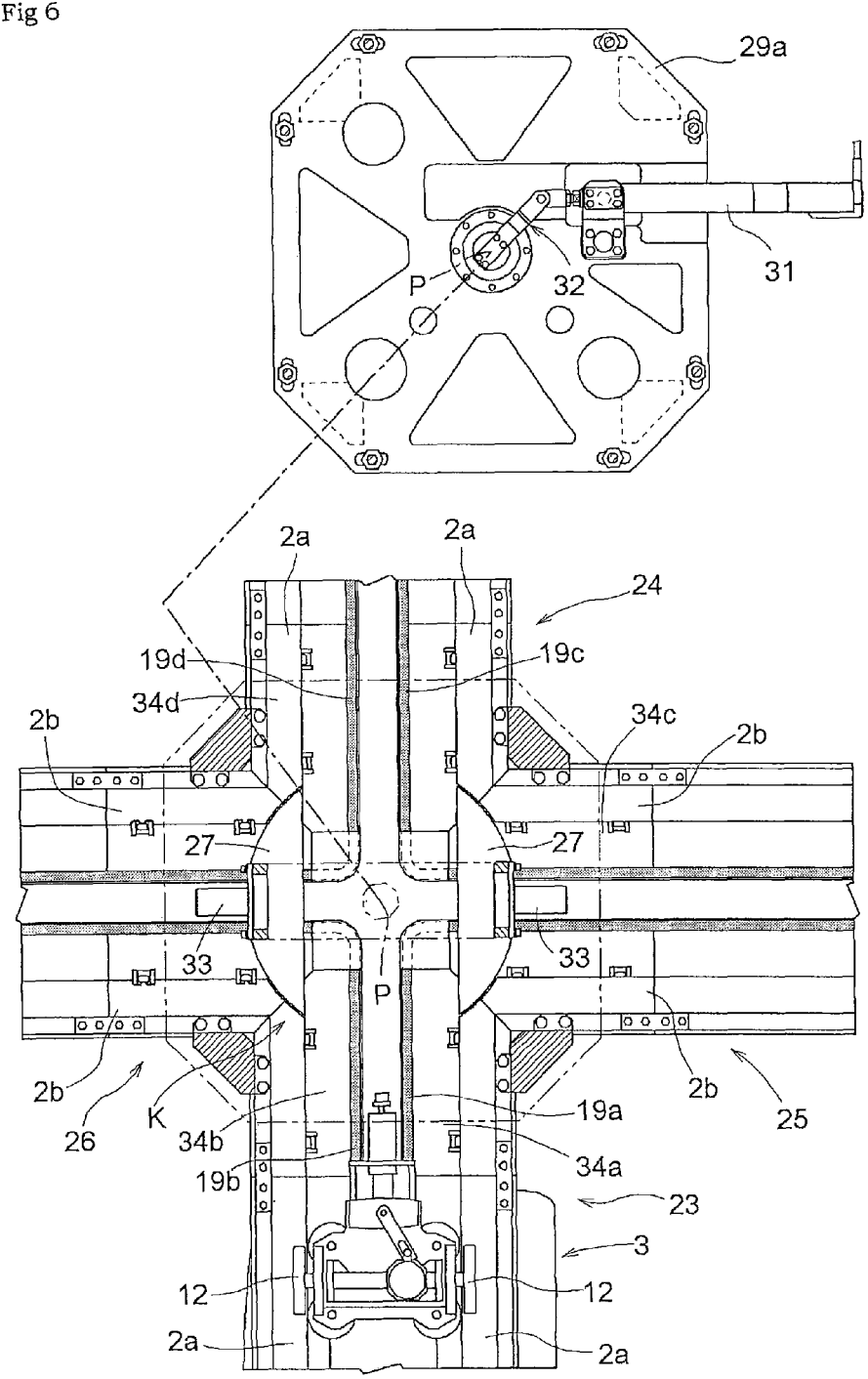
FIG. 6 is a plan view of the crossing portion when switched to the first switched state.
Figure 7:
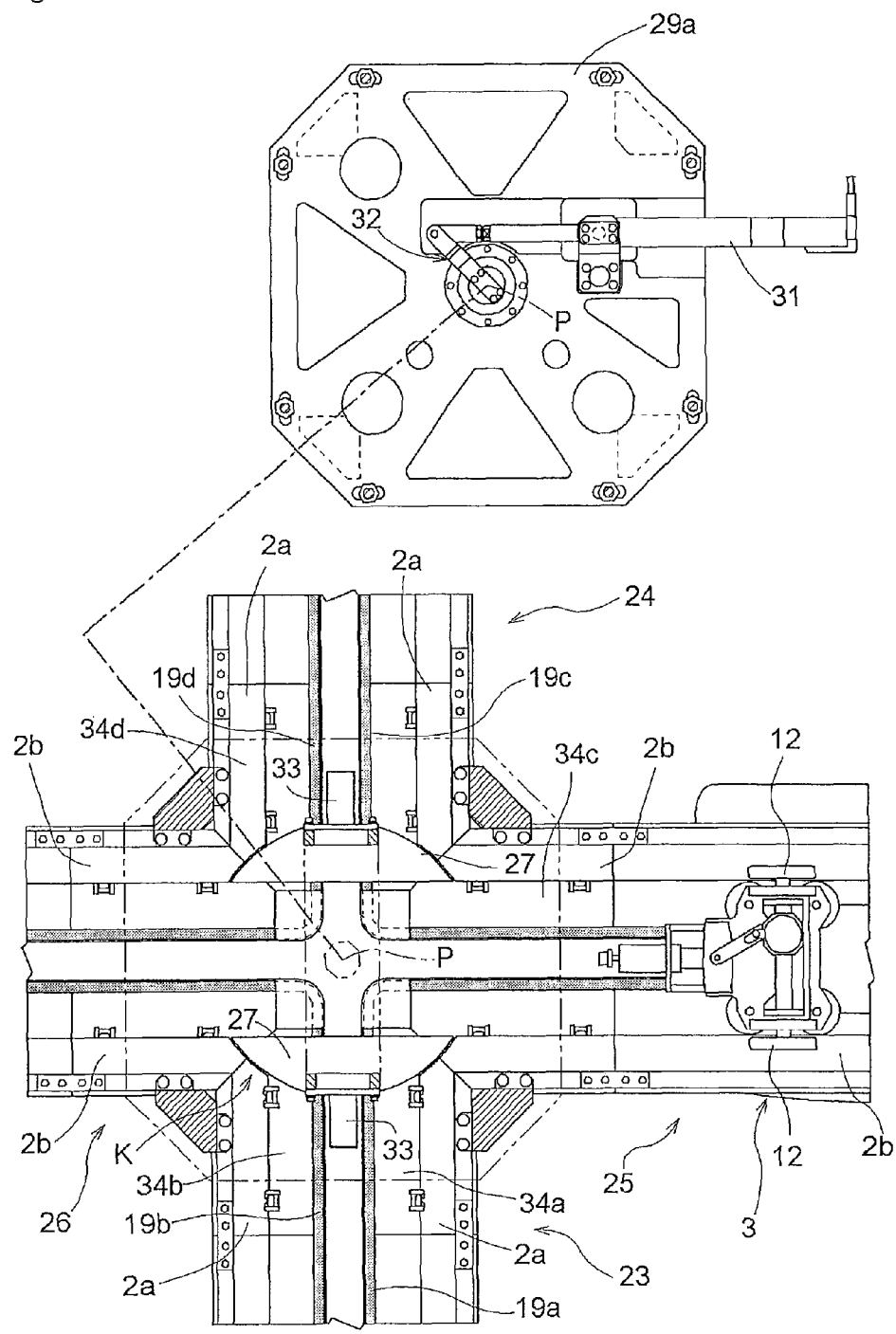
FIG. 7 is a plan view of the crossing portion when switched to the second switched state.
Figure 8:
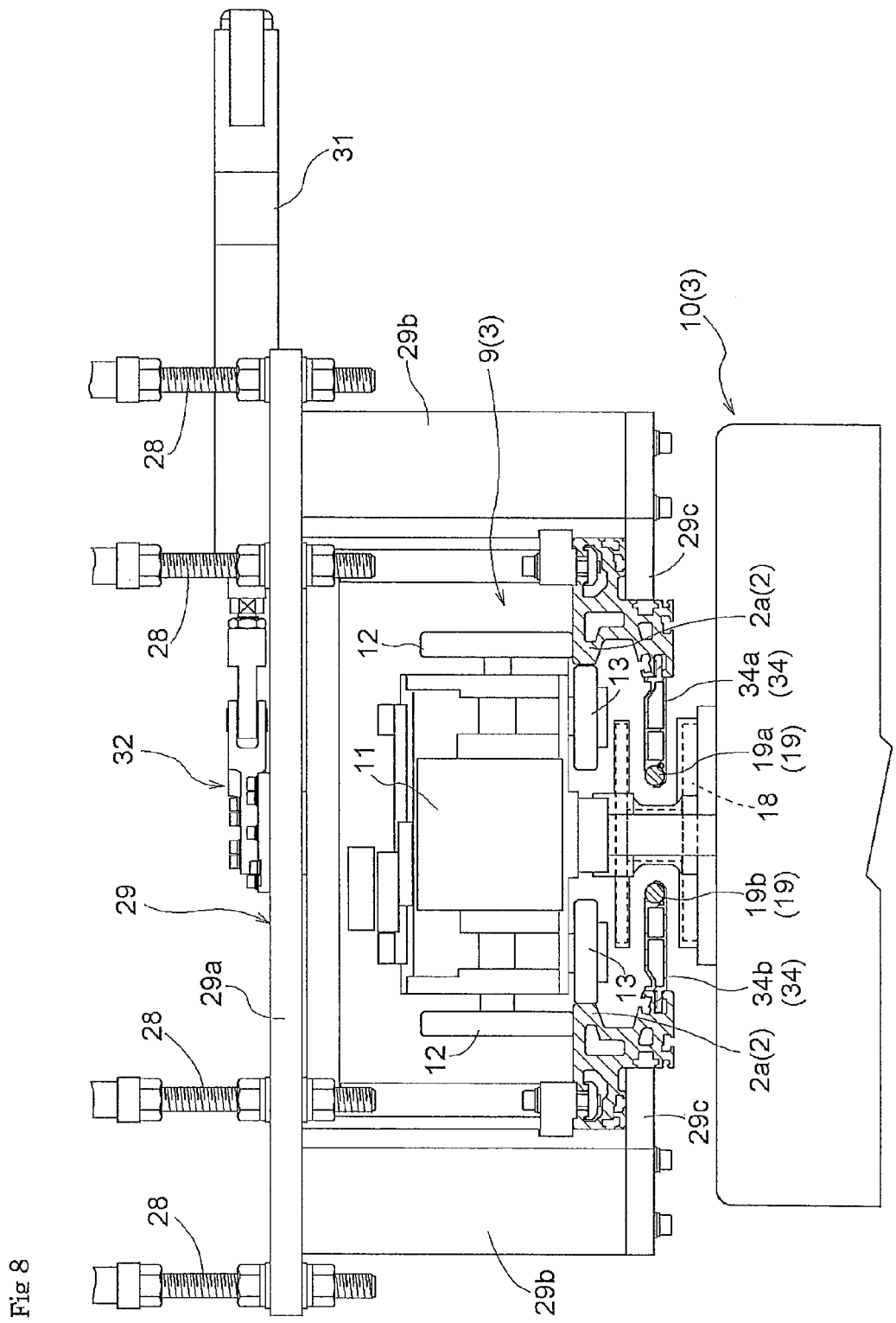
FIG. 8 is a sectional view taken at VIII-VIII in FIG. 5.
Figure 9:
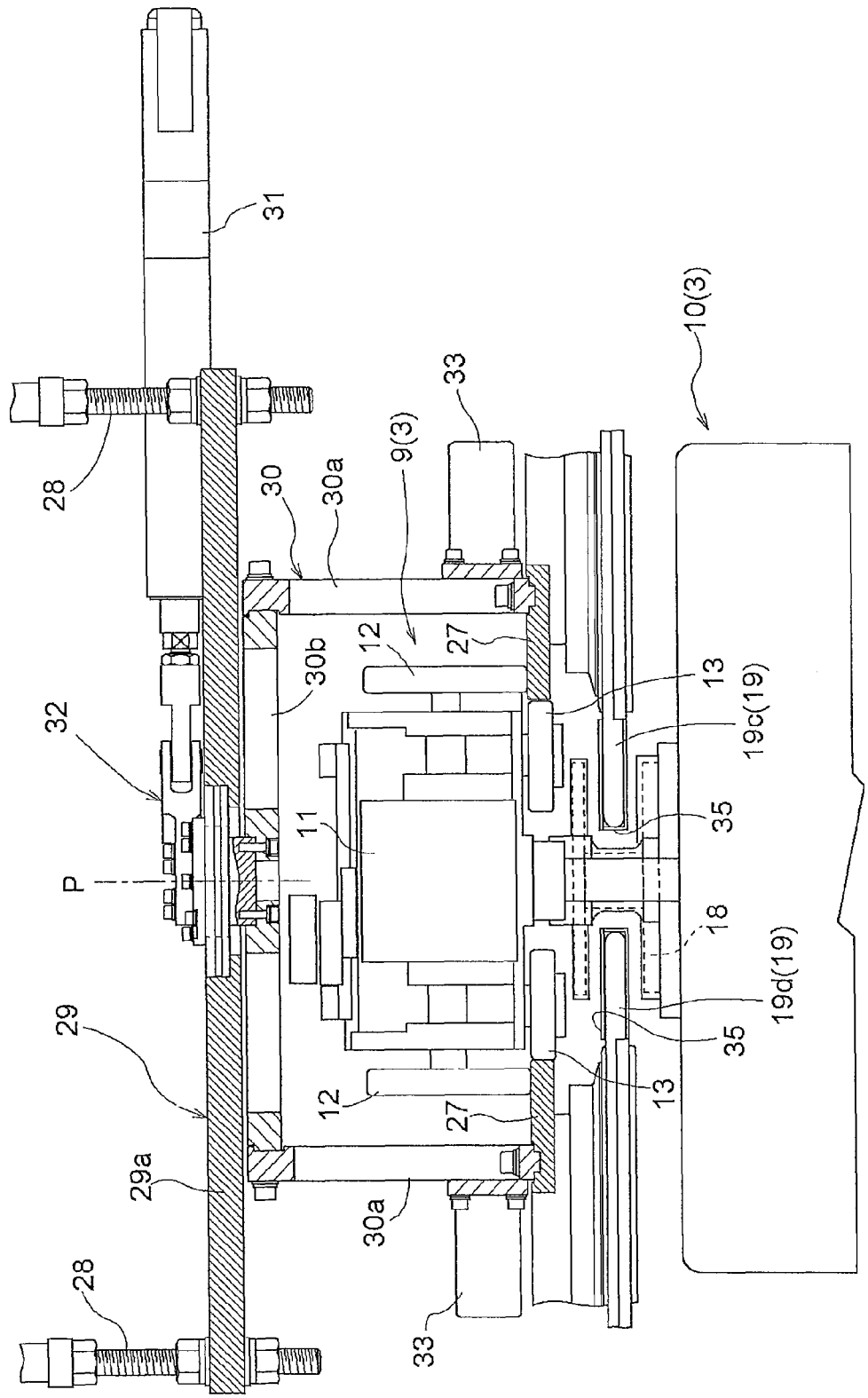
FIG. 9 is a sectional view taken at IX-IX in FIG. 5.

Here, FIG. 4 is a perspective schematic view showing the entire crossing portion K, whereas FIG. 5 is a plan schematic view showing the entire crossing portion K. And FIG. 6 is a plan view showing when the article transport vehicle 3 is allowed to pass along the primary path 20 whereas FIG. 7 is a plan view showing when the article transport vehicle 3 is allowed to pass along the inter-secondary-path connecting path 22. In addition, FIG. 8 is a sectional view taken at VIII-VIII in FIG. 5, whereas FIG. 9 is a sectional view taken at IX-IX in FIG. 5.

As shown in FIGS. 4-7, travel rails 2 for guiding and supporting the travel wheels 12 provided to the article transport vehicle 3 are provided in each of a primary path entrance portion 23, of the primary path 20, that is in series with and extends toward the crossing portion K and a primary path exit portion 24, of the primary path 20, that is in series with and extends away from the crossing portion K, a secondary path entrance portion 25, of an inter-secondary-path connecting path 22, that is in series with and extends toward the crossing portion K, and a secondary path exit portion 26, of an inter-secondary-path connecting path 22, that is in series with and extends away from the crossing portion K. In FIGS. 5-7, the primary path 20 is shown as a path extending in the vertical direction in the figures and the travel direction of the article transport vehicle 3 in the primary path 20 is defined to be toward the upper side from the lower side. And, in FIG. 5-FIG. 7, the inter-secondary-path connecting path 22 is shown as a path that extends along the right and left direction, or laterally in the figures and the travel direction of the article transport vehicle 3 in the inter-secondary-path connecting path 22 is defined to be the direction toward the left hand side from right hand side. And the primary path entrance portion 23 and the secondary path entrance portion 25 are the entrance portions whereas the primary path exit portion 24 and the secondary path exit portion 26 are the exit portions.

With regard to the travel rails 2, the rails 2 provided in the primary path entrance portion 23 and the primary path exit portion 24 are primary travel rails 2a (which function as first travel rails) whereas the rails 2 provided in the secondary path entrance portion 39 and the secondary path exit portion 40 are secondary travel rails 2b (which function as second travel rails).

As described above, while the primary travel rails 2a are provided in the primary path entrance portion 23 and in the primary path exit portion 24 whereas the secondary travel rails 2b are provided in the secondary path entrance portion 25 and in the secondary path exit portion 26, position change rails 27 which are in series with the primary travel rails 2a or the secondary travel rails 2b are provided in the crossing portion K. The position change rails 27 are configured to be rotated about a vertical axis between a first position (see FIG. 6) in which the position change rails 27 are in series with the primary travel rails 2a and a second position (see FIG. 7) in which the position change rails 27 are in series with the secondary travel rails 2b. And as shown in FIG. 9, the position change rails 27 are configured to guide and support the travel wheels 12 on their horizontally extending top surfaces, and to guide the travel guide wheels 13 with their vertically extending side faces, as in the case of the travel rails 2.

Thus, the primary travel rails 2a, the secondary travel rails 2b, and the position change rails 27 are each provided in the article transport facility in accordance with the present invention in order to guide and support the travel wheels 12 provided to the article transport vehicle 3. Since the travel wheels 12 are provided as a pair of travel wheels 12 such that they are spaced apart from each other in the lateral direction of the article transport vehicle 3 as shown in FIG. 5, the primary travel rails 2a, the secondary travel rails 2b, and the position change rails 27 are each also provided as a pair of right and left rails in order to guide and support each of the pair of right and left travel wheels 12, In other words, in the primary path entrance portion 23 and in the primary path exit portion 24, a pair of right and left primary travel rails 2a are provided such that they are spaced apart from each other in the lateral direction of the article transport vehicle 3 whereas, in the secondary path entrance portion 25 and the secondary path exit portion 26, a pair of right and left secondary travel rails 2a are provided such that they are spaced apart from each other in the lateral direction of the article transport vehicle 3. Also, a pair of right and left position change rails 27 are provided. And when the position change rails 27 are in the first position, each of the pair of right and left position change rails 27 is in series with the associated one of the pair of right and left primary travel rails 2a as shown in FIG. 6. And when the position change rails 27 are in the second position, each of the pair of right and left position change rails 27 is in series with the associated one of the pair of right and left secondary travel rails 2b as shown in FIG. 7.

The position change rails 27 are formed to be arc-shaped in plan view whereas the primary travel rails 2a and the secondary travel rails 2b are formed to be straight in plan view. And arc-shaped cutouts that have shapes that correspond to the shape of the position change rails 27 are formed at end portions, of the primary travel rail 2a and of the secondary travel rails 2b, that are on the side of the crossing portion K, in order to minimize the gap between the primary travel rails 2a and the position change rails 27 while allowing the position change rails 27 to be rotated about a vertical axis.

As shown in FIGS. 4 and 8, a rail support body 29, which is suspended from and supported by the ceiling by means of a plurality of suspending members 28, is provided in the crossing portion K. And the primary travel rails 2a and the secondary travel rails 2b are fixed to the rail support body 29. The rail support body 29 includes a plate-shaped upward-side portion 29a to which the suspending members 28 are attached, four pillar-shaped downwardly extending portions 29b extending downwardly from respective ones of four corners of the upward-side portion 29a, and horizontally extending portions 29c, each of which extends horizontally from the lower end portion of the associated one of the four downwardly extending portions 29b, for fixing the primary travel rails 2a and the secondary travel rails 2b thereto. The horizontally extending portions 29c are fixed to the lower ends of the downwardly extending portions 29b by a plurality of bolts or other conventional fastener. And the primary travel rails 2a and the secondary travel rails 2b are so located that they extend from outside into inside of the rail support body 29 through the space between the downwardly extending portions 29b. And the pair of right and left primary travel rails 2a and the pair of right and left secondary travel rails 2b are arranged so that they cross each other perpendicularly.

As shown in FIG. 9, the rail support body 29 supports the rotatable support 30 such that the support 30 is rotatable about a vertical axis P. And the pair of right and left position change rails 27 are fixed to the rotatable support 30. The rotatable support 30 includes two upwardly extending portions 30a which extend upwardly from respective ones of the pair of right and left position change rails 27, and a connecting portion 30b which connects together upper end portions of the two upwardly extending portions 30a. And a central portion of the connecting portion 30b extends through the upward-side portion 29a of the rail support body 29 in the vertical direction. And the central portion of the connecting portion 30b defines the pivot axis P for the rotatable support 30 so that the rotatable support 30 can be rotated with respect to the rail support body 29 about the pivot axis P. Incidentally, a stopper 33 (for example, stopper made of resin) for stopping the entry of the article transport vehicle 3 is provided in each of the upwardly extending portions 30a even if the article transport vehicle 3 erroneously attempts to enter the crossing portion K.

Provided on and above the upward-side portion 29a of the rail support body 29 are an electric or hydraulic cylinder 31 which functions as an actuator, and a linkage mechanism 32 for operatively connecting or associating the extending and retracting motion of the cylinder 31 with rotation of the rotatable support 30. More specifically, in FIG. 6, the cylinder 31 is retracted to rotate the rotatable support 30 about the pivot axis P by the linkage mechanism 32 so that the position change rails 27 are placed in the first position in which the position change rails 27 are in series with the primary travel rails 2a. And, in FIG. 7, the cylinder 31 is extended to rotate the rotatable support 30 about the pivot axis P by the linkage mechanism 32 so that the position change rails 27 are placed in the second position in which the position change rails 27 are in series with the secondary travel rails 2b.

As such, in the article transport facility in accordance with the present invention, the state can be switched, by means of, among other things, the cylinder 31, the linkage mechanism 32, and the rotatable support 30, between the first switched state in which the position change rails 27 are switched to the first position to allow the article transport vehicle 3 to travel through the position change rails 27 along the primary path 20 and the second switched state in which the position change rails 27 are switched to the second position to allow the article transport vehicle 3 to travel through the position change rails 27 along the secondary path 22. Thus, the switching means includes the cylinder 31, the linkage mechanism 32, and the rotatable support 30, etc. And the switching means is configured to be switched to the first switched state when allowing the article transport vehicle 3 to travel through the crossing portion K along the primary path 20, and to be switched to the second switched state when allowing the article transport vehicle 3 to travel through the crossing portion K along the inter-secondary-path connecting path 22. Other mechanism that belongs to conventional technology for rotating the rotatable support 30 about the pivot axis P can be used as switching means. For example, a structure may be used in which gear teeth are provided on the periphery of a vertical shaft that defines the axis P and which includes an electric motor connected to a gear that engages the gear teeth. As another example, a structure may be used in which a pulley is fixed to a vertical shaft that defines the axis P, in which another pulley that is actuated by an electric motor is provided, and in which these two pulleys are operatively connected with a belt or a timing belt.

The position change rails 27 guide and support the travel wheels 12 of the article transport vehicle 3 when it travels through the crossing portion K. And arrangements are made to reduce the load which the position change rails 27 bear at this time. More specifically, as shown in FIG. 5, the length D1 of the position change rails 27 in the travel direction of the article transport vehicle 3 is shorter than the wheelbase D2 of the pair of front and back travel wheels 12. Thus, the article transport vehicle 3 travels through the crossing portion K with only one of the front and back pairs of travel wheels 12 being guided and supported by the position change rails 27 and with the other pair being guided and supported by the travel rails 2, instead of both the front and back pairs of travel wheels 12 being guided and supported simultaneously by the position change rails 27. Therefore, the position change rails 27 are not required to be as strong as the travel rails 2, thus can be lighter in weight and simpler in structure. Thus, a simpler structure may be used for structures such as the support structure for rotating the position change rails 27 about a vertical axis.

As described above, concerning how the driving electric power is supplied to the article transport vehicle 3, driving electric power is supplied to the power receiving coil 18 of the article transport vehicle 3 without contact from a pair of electricity supply lines 19 supported by the pair of travel rails 2. And the carriage side controller of the article transport vehicle 3 is configured to operate the drive motor 11 using the driving electric power received with the power receiving coil 18 to travel along the travel path S. Thus, the article transport vehicle 3 travels along the travel paths S by receiving the driving electric power from the electricity supply lines 19. And the article transport vehicle 3 travels through the crossing portion K along the primary path 20 or along the inter-secondary-path connecting path 22 by receiving the driving electric power from the electricity supply lines 19 also in the crossing portion K.

As shown in FIGS. 4 and 5, in the article transport facility in accordance with the present invention, the electricity supply lines 19 in the crossing portion K are configured to be supported by the primary travel rails 2a such that the electricity supply lines 19 extend from the side of the primary travel rails 2a into the side of the position change rails 27 in the first position, and thus to be able to supply the driving electric power to the article transport vehicle 3 that is traveling on the position change rails 27 located in the first position. As such, the driving electric power is supplied to the article transport vehicle 3 that is traveling through the crossing portion K along the primary path 20 by means of the electricity supply lines 19 thus installed in this manner. Further, the electricity supply lines 19 in the crossing portion K are configured to be supported by the secondary travel rails 2b such that the electricity supply lines 19 extend from the side of the secondary travel rails 2b into the side of the position change rails 27 in the second position, and thus to be able to supply the driving electric power to the article transport vehicle 3 that is traveling on the position change rails 27 located in the second position. As such, the driving electric power is supplied to the article transport vehicle 3 that is traveling through the crossing portion K along the inter-secondary-path connecting path 22 by means of the electricity supply lines 19 thus installed in this manner.

Because the electricity supply lines 19 are not supported by the position change rails 27 which can be rotated about the pivot axis P, but are supported by the primary travel rails 2a and by the secondary travel rails 2b both fixed to the rail support body 29, a simple support configuration may be adapted in which the electricity supply lines 19 are simply fixed to the primary travel rails 2a and the secondary travel rails 2b, which facilitates the simplification of the structure for supporting the electricity supply lines 19.

The electricity supply lines 19 are supported by the primary travel rails 2a and the secondary travel rails 2b in the crossing portion K. And the electricity supply lines 19 installed in the crossing portion K have four bent portions, namely, a first bent portion 19a, a second bent portion 19b, a third bent portion 19c, and a fourth bent portion 19d as shown in FIGS. 5-7. Accordingly, the configuration of these bent portions is described further.

As described above, the pair of right and left primary travel rails 2a and the pair of right and left secondary travel rails 2b are so located that the primary travel rail 2a and the secondary travel rail 2b that are next to each other cross each other perpendicularly. And to each of the primary travel rails 2a and the secondary travel rails 2b that cross each other perpendicularly, an electricity supply line support body 34 is provided which extends between, or to span over, the primary travel rail 2a and the secondary travel rail 2b and which has a shape of a right angle (i.e., a shape generally bent at the right angle) and which supports each bent portion 19a-19d of the electricity supply lines 19. Four electricity supply line support bodies, namely the first-fourth electricity supply line support bodies 34a-34d are provided as the electricity supply line support bodies 34. And each of the first-fourth electricity supply line support bodies 34a-34d is configured to fixedly support one of the bent portions 19a-19d. Incidentally, a cover 35 (FIG. 9) is provided to the bent portion in each of the first-fourth electricity supply line support body 34a-34d to cover the bent portions 19a-19d of the electricity supply lines 19. As shown in FIG. 8, an electricity supply line support body 34 has a shape of a plate that extends from the primary travel rail 2a and from the secondary travel rail 2b and inwardly in the lateral direction of the article transport vehicle 3. And the bent portion 19a-19d of an electricity supply line 19 is received and supported by the distal end portions of the electricity supply line support body 34 with respect to the directions in which the body 34 extends.

As shown in FIGS. 5-7, the first electricity supply line support body 34a extends between, or to span over, the primary travel rail 2a in the primary path entrance portion 23 and the secondary travel rail 2b in the secondary path entrance portion 25 that cross each other perpendicularly whereas the second electricity supply line support body 34b extends between, or to span over, the primary travel rail 2a in the primary path entrance portion 23 and the secondary travel rail 2b in the secondary path exit portion 26 that cross each other perpendicularly. And the first electricity supply line support body 34a supports the first bent portion 19a whereas the second electricity supply line support body 34b supports the second bent portion 19b. The third electricity supply line support body 34c extends between, or to span over, the primary travel rail 2a in the primary path exit portion 25 and the secondary travel rail 2b in the secondary path entrance portion 25 that cross each other perpendicularly whereas the fourth electricity supply line support body 34d extends between, or to span over, the primary travel rail 2a in the primary path exit portion 24 and the secondary travel rail 2b in the secondary path exit portion 26 that cross each other perpendicularly. And the third electricity supply line support body 34c supports the third bent portion 19c whereas the fourth electricity supply line support body 34d supports the fourth bent portion 19d. As such, the electricity supply lines 19 are supported by the primary travel rails 2a such that the electricity supply lines 19 extend from the side of the primary travel rails 2a, and beyond the ends of the position change rails 27 in the first position in the travel direction, and to within the position change rails 27 in plan view, and are supported by the secondary travel rails 2a such that the electricity supply lines 19 extend from the side of the secondary travel rails 2b, and beyond the ends of the position change rails 27 in the second position, and to within the position change rails 27 in plan view.

And each of the four bent portions 19a-19d is installed in a bent shape such that it extends from the side of the primary travel rail 2a (primary travel rail side) to the position change rail 27 (position change rail side) in the first position, is then bent to extend from the side of the position change rail 27 (position change rail side) in the second position and to the side of the secondary travel rail 2b (second travel rail side). With the bent portions thus installed, driving electric power can be supplied to the article transport vehicle 3 traveling along the primary travel rails 2a and the position change rails 27 in the first position by the portion in each of the bent portions 19a-19d that extends from the side of the primary travel rail 2a (primary travel rail side) to the side of the position change rail 27 (position change rail side) in the first position. And driving electric power can be supplied to the article transport vehicle 3 traveling along the position change rails 27 in the second position and the secondary travel rails 2b by the portion in each of the bent portions 19a-19d that extends from the side of the position change rail 27 (position change rail side) in the second position to the side of the secondary travel rail 2b (secondary travel rail side). As such, one bent portion 19a-19d can function, or can be used, both as a part of the electricity supply line 19 for supplying driving electric power to the article transport vehicle 3 traveling through the crossing portion K along the primary path 20 and as a part of the electricity supply line 19 for supplying driving electric power to the article transport vehicle 3 traveling through the crossing portion K along the inter-secondary-path connecting path 22. And only one electricity supply line support body 34 is required to support one bent portion 19a-19d; therefore, the structure for supporting the electricity supply lines 19 can be simplified.

The four bent portions 19a-19d are so installed that they are symmetrical with respect to both the travel direction of the article transport vehicle 3 when traveling along the primary path 20 and the travel direction of the article transport vehicle 3 when traveling along the inter-secondary-path connecting path 22. This arrangement allows the four bent portions 19a-19d to be installed in a well-balanced manner so that driving electric power can be properly supplied in a balanced manner both to the article transport vehicle 3 traveling through the crossing portion K along the primary path 20 and to the article transport vehicle 3 traveling through the crossing portion K along the inter-secondary-path connecting path 22.

Operation of the article transport vehicle 3 when traveling through the crossing portion K is described next.

The article transport vehicle 3 when traveling through along the primary path 20 is described first. As shown in FIG. 6, when allowing the article transport vehicle 3 to travel through along the primary path 20, the switching means switches to the first switched state to position the position change rail 27 in the first position. And after traveling along the primary travel rails 2a in the primary path entrance portion 23, the article transport vehicle 3 moves onto the position change rails 27 in the first position from the primary travel rails 2a, and subsequently moves onto the primary travel rails 2a in the primary path exit portion 24 from the position change rails 27.

As shown in FIG. 6, driving electric power is supplied to the article transport vehicle 3 from the first bent portion 19a and the second bent portion 19b when the article transport vehicle 3 travels along the primary travel rails 2a in the primary path entrance portion 23. As shown in FIG. 8, during this time, the first bent portion 19a and the second bent portion 19b are located within the electricity suppliable region of the power receiving coil 18 (i.e., area which is vertically between the upper portion and the lower portion of the power receiving coil 18) so that the driving electric power can be properly supplied to the power receiving coil 18 from the first bent portion 19a and the second bent portion 19b.

Subsequently, although the article transport vehicle 3 moves from the primary travel rails 2a onto the position change rails 27 in the first position, the driving electric power can continued to be properly supplied to the article transport vehicle 3 from the first bent portion 19a and the second bent portion 19b because the first bent portion 19a and the second bent portions 19b extend into the position change rails 27 in the first position.

And while traveling along the position change rails 27 in the first position, or while moving from the position change rails 27 onto the primary travel rails 2a in the primary path exit portion 24, the bent portions that supply electric power are replaced from the first bent portion 19a and the second bent portion 19b to the third bent portion 19c and the fourth bent portion 19d so that driving electric power is now supplied to the article transport vehicle 3 from the third bent portion 19c and the fourth bent portion 19d. To this end, because the third bent portion 19c and the fourth bent portion 19d also extend into the side of the position change rails 27 in the first position, driving electric power can be properly supplied to the article transport vehicle 3 while it is traveling along the position change rails 27 in the first position or while moving from the position change rails 27 onto the primary travel rails 2a in the primary path exit portion 24.

Subsequently, when the article transport vehicle 3 moves onto and travels along the primary travel rails 2a in the primary path exit portion 24, the driving electric power can continued to be properly supplied to the article transport vehicle 3 from the third bent portion 19c and the fourth bent portion 19d.

The article transport vehicle 3 when traveling through along the inter-secondary-path connecting path 22 is described next. As described above, the four bent portions 19a-19d are so installed that they are symmetrical with respect to both the travel direction of the article transport vehicle 3 when traveling along the primary path 20 and the travel direction of the article transport vehicle 3 when traveling along the inter-secondary-path connecting path 22 with only the bent portions that supply driving electric power to the article transport vehicle 3 being different between the two cases; thus, the description is given with some omissions.

As shown in FIG. 7, the switching means switches to the second switched state to position the position change rails 27 in the second position when allowing the article transport vehicle 3 to travel through along the inter-secondary-path connecting path 22. And after traveling along the secondary travel rails 2b in the secondary path entrance portion 25, the article transport vehicle 3 moves from the secondary travel rails 2b onto the position change rails 27 in the second position, and subsequently, moves onto the secondary travel rails 2b in the secondary path exit portion 26 from the position change rails 27. Thus, with regard to the supplying of the driving electric power to the article transport vehicle 3, driving electric power is supplied to the article transport vehicle 3, at first, from the first bent portion 19a and the third bent portion 19c. And subsequently the first bent portion 19a and the third bent portion 19c are replaced by the second bent portion 19b and the fourth bent portion 19d to supply the driving electric power to the article transport vehicle 3. Here also, the driving electric power can be properly supplied to the article transport vehicle 3 because each of the four bent portions 19a-19d extends into the position change rails 27 in the second position.

There is a portion where the electricity supply lines 19 are not installed in the central portion of the crossing portion K in the travel direction of the article transport vehicle 3 regardless of whether the article transport vehicle 3 is traveling along the primary path 20 or along the inter-secondary-path connecting path 22. However, each bent portion 19a-19d is installed close to each other in the travel direction of the article transport vehicle 3 to minimize the length of this portion. Thus, the power receiving coil 18 of the article transport vehicle 3 can receive sufficient driving electric power from each bent portion 19a-19d to allow the article transport vehicle 3 to travel through the crossing portion K regardless of whether the article transport vehicle 3 is traveling along the primary path 20 or along the inter-secondary-path connecting path 22. Therefore, driving electric power can be properly supplied from each bent portion 19a-19d to the article transport vehicle 3 so that the article transport vehicle 3 can properly travel in the crossing portion K either along the primary path 20 or along the inter-secondary-path connecting path 22.

[Alternative Embodiments]

(1) In the embodiment described above, an example is described in which the crossing portion K is where the primary path 20 and the inter-secondary-path connecting path 22 cross each other. However, it is possible to apply the article transport facility in accordance with the present invention to any crossing portion at which a certain path and another path cross each other.

In the embodiment described above, a curved diverging path which diverges or breaks off from the primary path 20 and which is connected to a secondary path 21 and a curved converging path which converges or merges with the primary path 20 from the secondary path 21 are provided in the crossing portion at which the primary path 20 and the inter-secondary-path connecting path 22 cross each other. The article transport facility in accordance with the present invention may be applied not only to a crossing portion having a curved diverging path and a curved converging path but also to a crossing portion in which two travel paths having no curved travel paths cross each other perpendicularly. For example, as shown with the dotted lines in FIG. 1, a looped travel path S that perpendicularly crosses the secondary paths 21 may be provided. And the crossing portion in which a secondary path 21 and the looped travel path S (travel path shown with dotted lines in the figure) cross each other is formed as a crossing portion in which two travel paths having no curved travel paths cross each other perpendicularly. And the article transport facility in accordance with the present invention can be applied to this crossing portion K.

(2) In the embodiment described above, an example is described in which the crossing portion K is one where the primary path 20 and the inter-secondary-path connecting path 22 cross each other perpendicularly. However, the invention may be embodied not only in the crossing portion in which two such paths cross each other perpendicularly but also in a crossing portion in which two paths cross each other at an oblique angle (i.e., angle smaller than 90 degrees). In addition, the crossing portion may be one in which two paths join to form one path, or one in which one path splits into two paths. In a crossing portion in which two paths join to form one path, the common exit portion functions as the exit portion of the first path as well as the exit portion of the second path. And in the crossing portion in which one path splits into two paths, the common entrance portion functions as both the entrance portion of the first path and the entrance portion of the second path.

(3) In the embodiment described above, an example is described in which each of the travel wheels 12, the travel rails 2, the position change rails 27, and the electricity supply lines 19 come in a pair with one right hand side member and one left hand side member. However, for example, it is also possible that each of the travel wheels 12, the travel rails 2, and the position change rails 27 comes in a pair with one right hand side member and one left hand side member and that only one electricity supply line 19 is provided. Thus, changes may be made suitably as to the number of the travel wheels 12, the travel rails 2, the position change rails 27, and the electricity supply lines 19.

INDUSTRIAL APPLICABILITY

The article transport facility in accordance with the present invention may be used, for example, in a facility for processing semiconductor substrates, among other kinds of facilities.

The invention claimed is:
1. An article transport facility comprising:
an article transport vehicle having a travel wheel and to which driving electric power is supplied from an electricity supply line installed along travel paths to allow the article transport vehicle to travel;
a first path and a second path provided as the travel paths; and
switching means, provided in a crossing portion in which the first path and the second path cross each other, for switching between a first switched state in which the article transport vehicle is allowed to travel through the crossing portion along the first path and a second switched state in which the article transport vehicle is allowed to travel through the crossing portion along the second path,
wherein a first travel rail that guides and supports the travel wheel is provided in the first path in each of an entrance portion that is in series with and extends toward the crossing portion and an exit portion that is in series with and extends away from the crossing portion,
wherein a second travel rail that guides and supports the travel wheel is provided in the second path in each of an entrance portion that is in series with and extends toward the crossing portion and an exit portion that is in series with and extends away from the crossing portion, wherein a position change rail, whose position can be changed between a first position which is in series with the first travel rail and a second position which is in series with the second travel rail, is provided in the crossing portion, wherein the switching means is configured to switch to the first switched state by switching the position change rail to the first position, and is configured to switch to the second switched state by switching the position change rail to the second position, wherein the electricity supply line is supported by the first travel rail such that driving electric power can be supplied to the article transport vehicle when traveling along the first travel rail and when traveling along the position change rail in the first position, and is supported by the second travel rail such that driving electric power can be supplied to the article transport vehicle when traveling along the second travel rail and when traveling along the position change rail in the second position, and wherein the electricity supply line is supported by the first travel rail such that the electricity supply line extends from a first travel rail side and beyond an end of the position change rail in the first position and into the position change rail in plan view so that the electricity supply line can supply driving electric power to the article transport vehicle traveling along the position change rail in the first position, and is supported by the second travel rail such that the electricity supply line extends from a second travel rail side and beyond an end of the position change rail in the second position and into the position change rail in plan view so that the electricity supply line can supply driving electric power to the article transport vehicle traveling along the position change rail in the second position.

2. The article transport facility as defined in claim 1, wherein the article transport vehicle includes, as the travel wheel, a pair of right and left travel wheels which are spaced apart from each other in the lateral direction of the article transport vehicle, wherein the first travel rail, the second travel rail, and the position change rail are each provided as a pair of right and left rails so as to guide and support the pair of respective ones of the right and left travel wheels.

3. The article transport facility as defined in claim 2, wherein the electricity supply line is provided as a pair of right and left electricity supply lines which are spaced apart from each other in a lateral direction of the article transport vehicle such that the electricity supply lines are supported by the pair of right and left first travel rails and by the pair of right and left second travel rails.

4. The article transport facility as defined in claim 3, wherein the pair of right and left first travel rails, and the pair of right and left second travel rails are arranged such that the first travel rail and the second travel rail that are next to each other cross each other perpendicularly, wherein the electricity supply lines include four bent portions, each of which extends from a first travel rail side to the position change rail side in the first position and which is then bent and extends from a position change rail side in the second position and to a second travel rail side, and wherein provided to each of the first travel rail and the second travel rail that cross each other perpendicularly is an electricity supply line support body which extends between the first travel rail and the second travel rail and which is generally bent at the right angle for supporting the bent portion of the electricity supply lines.

5. An article transport facility comprising:

an article transport vehicle having a travel wheel and to which driving electric power is supplied from an electricity supply line installed along travel paths to allow the article transport vehicle to travel;

a first path and a second path provided as the travel paths; and switching means, provided in a crossing portion in which the first path and the second path cross each other, for switching between a first switched state in which the article transport vehicle is allowed to travel through the crossing portion along the first path and a second switched state in which the article transport vehicle is allowed to travel through the crossing portion along the second path, wherein a first travel rail that guides and supports the travel wheel is provided in the first path in each of an entrance portion that is in series with and extends toward the crossing portion and an exit portion that is in series with and extends away from the crossing portion, wherein a second travel rail that guides and supports the travel wheel is provided in the second path in each of an entrance portion that is in series with and extends toward the crossing portion and an exit portion that is in series with and extends away from the crossing portion, wherein a position change rail, whose position can be changed between a first position which is in series with the first travel rail and a second position which is in series with the second travel rail, is provided in the crossing portion, wherein the switching means is configured to switch to the first switched state by switching the position change rail to the first position, and is configured to switch to the second switched state by switching the position change rail to the second position, wherein the electricity supply line is supported by the first travel rail such that driving electric power can be supplied to the article transport vehicle when traveling along the first travel rail and when traveling along the position change rail in the first position, and is supported by the second travel rail such that driving electric power can be supplied to the article transport vehicle when traveling along the second travel rail and when traveling along the position change rail in the second position, and wherein a pair of front and back travel wheels are provided, as the travel wheel, to the article transport vehicle such that the front and back travel wheels are spaced apart from each other in a fore and aft direction of the article transport vehicle, wherein the position change rail is configured such that a length of the position change rail in the travel direction of the article transport vehicle is shorter than a wheelbase of the pair of front and back travel wheels.

* * * * *